United States Patent [19]

Sample

[11] Patent Number: 4,919,567
[45] Date of Patent: Apr. 24, 1990

[54] SUBSURFACE DUNE RESTORATION SYSTEM AND METHOD

[76] Inventor: Jay W. Sample, 2119 Longview Dr., Tallahassee, Fla. 32303

[21] Appl. No.: 359,795

[22] Filed: Jun. 1, 1989

[51] Int. Cl.⁵ .............................................. E02B 3/12
[52] U.S. Cl. ...................................... 405/19; 405/17; 405/18
[58] Field of Search ................. 405/15, 16, 17, 18–20, 405/28–34, 258

[56] References Cited

U.S. PATENT DOCUMENTS

| | | | |
|---|---|---|---|
| 1,691,848 | 11/1928 | Johnson | 405/19 |
| 3,699,686 | 10/1972 | De Winter | 405/19 |
| 3,786,640 | 1/1974 | Turzillo | 405/18 |
| 4,102,137 | 7/1978 | Porraz et al. | 405/18 |
| 4,449,847 | 5/1984 | Scales et al. | 405/19 |

FOREIGN PATENT DOCUMENTS 2217970  9/1974  France .................................. 405/19

Primary Examiner—Dennis L. Taylor
Attorney, Agent, or Firm—Charles R. Engle

[57] ABSTRACT

A Subsurface Dune Restoration System making use of large sand-filled geotextile containers which become somewhat fluid and flexible during wave run-up on a surface being protected providing a soft revetment. A fluid transfer system is operable to both fill the containers and support them in an installed position. The containers are effective to dissipate wave action and aid natural accretion by slowing water velocity while not providing a rigid or hard revetment. The reduction of the wave force and water velocity and the soft revetment surfaces are the result of use of container materials having predetermined permeability and weather resistant characteristics. The permeability is limited to ranges permitting seepage of water while retaining the sand within the containers.

14 Claims, 6 Drawing Sheets

SUBSURFACE DUNE RESTORATION SYSTEM AND METHOD

FIELD OF THE INVENTION

The present invention relates to an improved beach and dune erosion control system and method of installation in which a plurality of large sand-filled geotextile containers are used to present a predetermined soft and sloping revetment surface dissipating impacting turbulent wave action in a predetermined manner. In preferred form, the sand-filled geotextile containers are placed in a relationship so that multiple stair step courses of containers are positioned shore parallel to erosive, impacting, turbulent waves. An improved method of installation and filling the containers includes suspending each container on an anchoring tube which also facilitates simultaneous filling of a prepositioned container.

DESCRIPTION OF THE PRIOR ART

Conventional attempts to regulate and prohibit beach and dune erosion usually involve installation of wood, steel, or concrete vertical seawalls; installation of a plurality of piles in close contact to form a wall, or the positioning of large rocks or interlocking concrete blocks upon the surface to be protected forming what is known as a hard revetment. These types of rigid shoreline structures have several disadvantages in that after a period of time the desired result is not obtained. Eventually high seas, wave attack and storm weather conditions will simply result in a test of whether the vertical seawall or rocks are capable of providing a sufficient resistive force to continue to reflect the wave action. Quite frequently the storm forces are superior and the seawalls are breached or dislodged or the rocks are scattered about a recreational beach surface causing undesirable aesthetic appearances as well as failing to prevent erosion in a particular beach area. A particular disadvantage of a rigid vertical seawall is that after continual wave induced toe scour erosion against the wall and around the wall, the waves are eventually successful in undermining the lower edge of the wall causing the wall to topple over, or they are capable of working around the ends of the wall and getting behind the wall such that the wall is breached or dislodged and is ineffective as a wave force obstructing device. Likewise, a rock revetment generally results in serious accelerated erosion around the ends of the area covered by the rocks and in a manner similar to that occurring with a vertical seawall, the settling or dislodged rocks become ineffective to prevent erosion in the desired area. In addition, documented evidence of a global nature indicates that utilization of vertical seawalls or hard revetments can result in serious erosion of both the sandy recreational beaches fronting the structure as well as on the adjoining coastal properties at each end of the area that is attempted to be protected, because of the reflected wave action and accelerated wave wash around the ends of those inordinately hard surfaces in a soft sandy beach environment.

SUMMARY OF THE INVENTION

In view of the foregoing, an object of this invention is the provision of a Subsurface Dune Restoration System providing a relatively soft, gently sloping, stepped, permeable wave impact surface, gradually dissipating wave forces in a manner preventing beach and dune erosion.

Another object of the invention is the provision of a flexible revetment presenting a soft wave impacting surface effective to reduce the erosive velocity of impacting waves and facilitate the deposit of waveborne sand particles upon the upper surface of the shore protective structure.

A further object of the invention is the provision of a dune restoration system preventing dune erosion by controlling turbulent wave action in a way that sand is eventually restored to previously eroded areas.

A still further objective of the invention is the provision of dune restoration system presenting a particular predetermined soft wave impacting surface dissipating the force of storm waves during severe high water conditions.

Yet another object of this invention is the provision of a Subsurface Dune Restoration System having a predesigned wave absorption surface, which ascends as the system is installed landward so that the impacting waves are deterred in a predetermined predictable manner preventing dune erosion.

A further object of the invention is the provision of a Subsurface Dune Restoration System installed underneath a beach and dune surface and being effective to prevent dune erosion while not normally being visible in the area protected.

Another object of the invention is provision of a Subsurface Dune Restoration System that is readily installed without adversely affecting the natural appearance and function of the sandy recreational beach in an area protected by the restoration system.

Yet another object of the invention is the provision of a Subsurface Dune Restoration System incorporating means for securing the lowest portion of the system in place near sea level and additional fastening means retaining the system in place at the uppermost landward edge of an installed system.

A still further object of the invention is the provision of a Subsurface Dune Restoration System utilizing a minimum of structural devices thus reducing interference with the aesthetic appearances of the protected beach area.

A still further object of the invention is the provision of a Subsurface Dune Restoration System including components formed in a way that recreational use of the particular beach area is not interfered with although the system may infrequently become partially exposed.

A further object of the invention is the provision of an improved method of installation of a Subsurface Dune Restoration System.

Another object of the invention is provision of a Subsurface Dune Restoration System wherein components are designed to engage one another in a manner tending to retain themselves in place.

A further object is the provision of a Subsurface Dune Restoration System incorporating an anchoring system that assures alignment across a protected beach surface.

A still further object of the invention is the provision of an anchoring tube that permits simultaneous filling of a beach protecting component.

Another object of the invention is the provision of a geotextile erosion control container including an outer layer of shielding material on its wave impacting surfaces deterring puncture of the container when debris is washed ashore.

A further object of the invention is the provision of a space between the container outer shielding layer and the upper layer of geotextile material forming the container which can be permitted to be filled with sand and water by wave action or be filled with a cushioning material further resisting puncture by debris washed ashore.

Additional objects and advantages of the invention will be set forth in part in the description which follows, and in part will be obvious from the description or may be learned by practice of the invention. The objects and advantages of the invention may be realized and obtained by means of the instrumentalities in combinations particularly pointed out in the appended claims.

The foregoing objects of the invention have been achieved by providing a prepared sloped surface extending landwardly and upwardly away from a shoreline, the surface being preferably covered by a layer of geotextile filter cloth. First fastening means are provided at the seaward edge of the filter cloth for retaining the cloth in place. A plurality of large containers are placed upon and positioned in a shore parallel relationship providing multiple stepped rows or courses along the beach and dune area to be protected. The courses of sand-filled geotextile containers are positioned in contact with one another in a stairstep, ascending relationship so that as the courses progress landwardly, they ascend upwardly on the prepared, sloped surface. The large sand-filled containers each receive a plurality of loops of the continuous strap restraint systems at spaced intervals across the dune area being protected. The continuous strap restraint loops receive a fluid transfer tube positively positioning each container in its respective course alignment. The fluid transfer tube contains a plurality of serially spaced discharge ports for filling the geotextile container with sand while also retaining the container in place. Second fastening means are provided at the upper crest of the sloped surface retaining the filter cloth and the strap restraint systems in place so as to flexibly secure the Subsurface Dune Restoration System in place.

The accompanying drawings, which are incorporated in and constitute a part of the specification, illustrate one embodiment of the invention and together with the description, serve to explain the principles of the invention.

DESCRIPTION OF THE PREFERRED EMBODIMENT

Reference will now be made in detail to the present preferred embodiment of the invention, an example of which is illustrated in the accompanied drawings.

Figure 1:
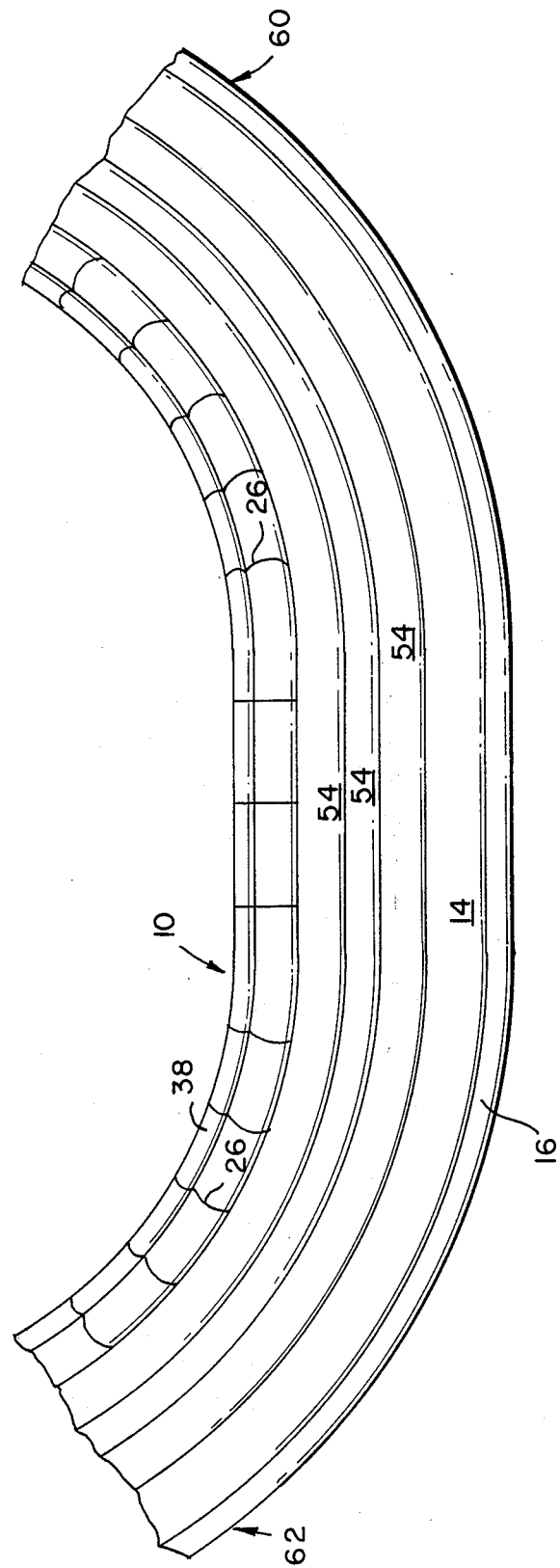
FIG. 1 is an plan view illustrating a Subsurface Dune Restoration System installed in accordance with provisions of the invention.
Figure 2:
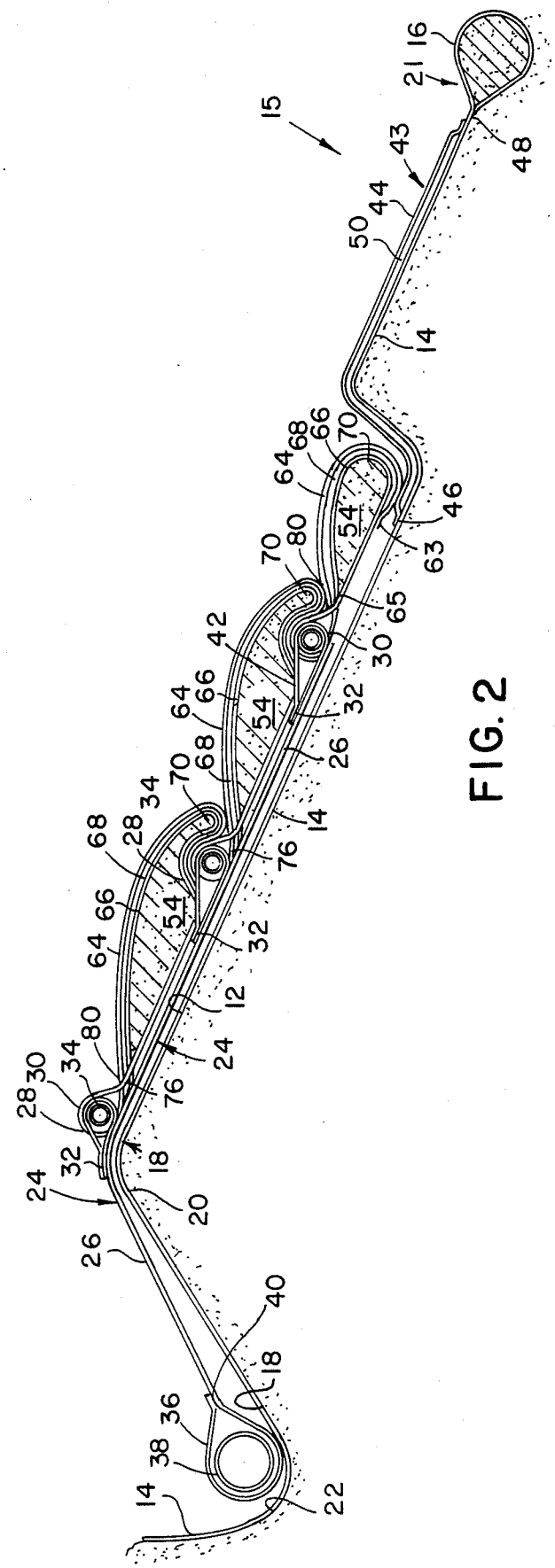
FIG. 2 is an end view of sand-filled geotextile containers installed upon respective fluid transfer tubes retained by strap restraint systems attached to a crest anchor tube of the subject invention.

The preferred embodiment of the Subsurface Dune Restoration System of my invention is shown in FIG. 1 and is represented generally by the numeral 10. A dune surface 12, illustrated in FIG. 2, is prepared to provide a predetermined slope for supporting a Subsurface Dune Restoration System. Preferably, this surface has a three(horizontal) to one(vertical) slope although a more gentle slope ma be employed. A filter cloth foundation 14 is placed upon the sloping surface 12 and is dimensioned such that it extends seaward and forms a sand-filled toe scour protection device 15 including a tube or first fastening means 16 at the lower end 21 of the sloping surface 12 as illustrated. The toe scour protection device 15, which includes a toe scour anchor tube 16 in combination with the sloped apron portion of filter cloth 14, will now be described. The filter cloth 14 is looped about itself and secured at 17 forming the toe scour anchor tube. The tube 16 is filled with sand and is buried below the beach surface for retaining the toe scour protection apron in place. Obviously, it can be extended out into the water and covered with sand or be buried below the beach surface adjacent to the water's edge at any predetermined place for purposes of securing the toe scour protection device including apron portion 14 in place. An advantage of this configuration resides in the fact that it is a continuous, flexible connection along the entire length of the installed filter cloth underlay, thus eliminating tension points at any particular point in fastening the filter cloth foundation in place as would usually occur with more conventional fastening devices.

Figure 3:
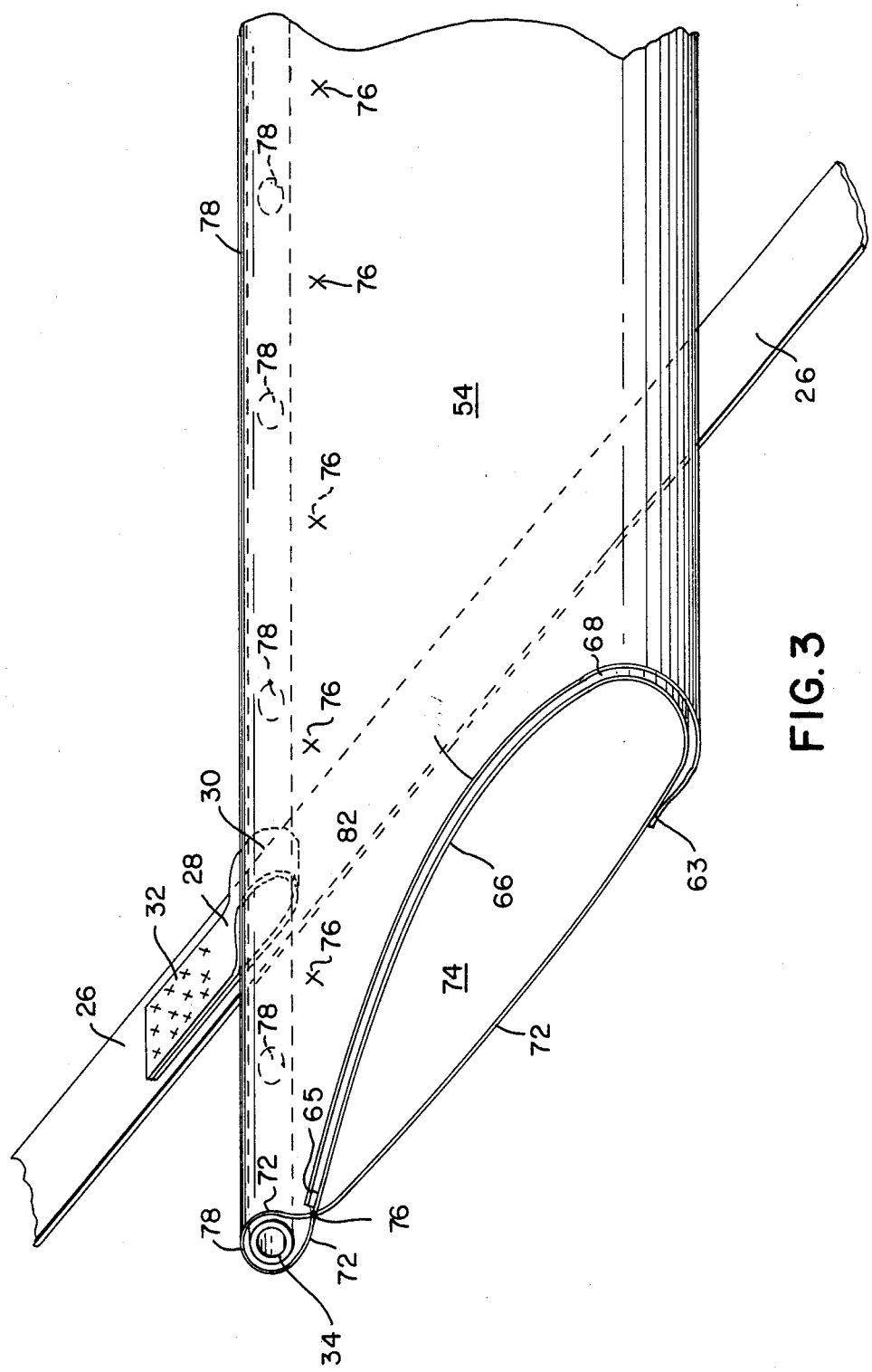
FIG. 3 is a perspective view of a geotextile container more specifically illustrating the fluid transfer tube and the strap restraint system.
Figure 5:
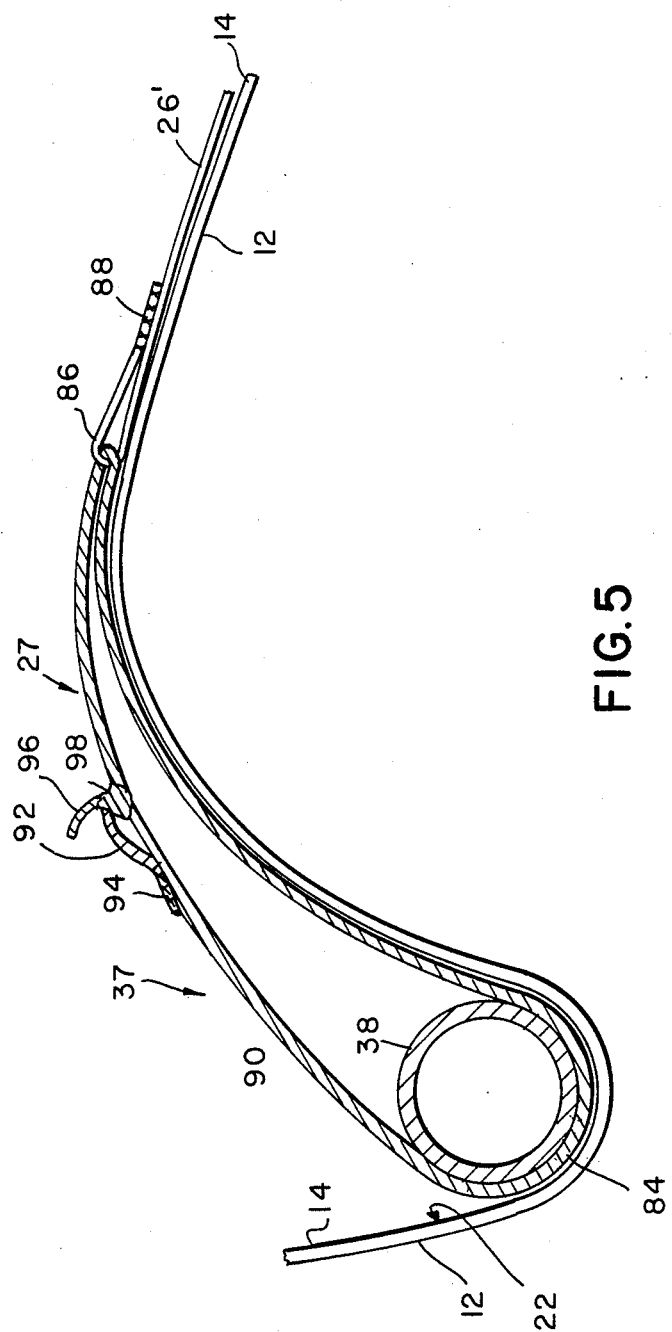
FIG. 5 is a fragmentary plan view of strap restraint systems attached to a crest anchor tube and one fluid transfer tube showing distribution of forces across the length of the crest anchor tube.

At the upper end 18 of sloping surface 12, an arcuate surface 20 is excavated in the dune area and the filter cloth 14 is positioned in contact with this surface extending down into trench 22. A strap restraint system 24 is composed of a single strap member 26 and is dimensioned to provide a predetermined tensile strength as it extends downward sloping surface 12. Short pieces of strap material 28 are folded back, forming loops 30, and are attached to the strap 26 at predetermined locations 32 by stitching or by other conventional means. The loops 30 each receive and position a fluid transfer tube 34 as illustrated in FIGS. 3 and 5. The strap 26, in one embodiment shown in FIG. 2, has an upper end terminating in a loop 36 receiving crest anchor tube 38. The strap 26 and the crest anchor tube cooperate forming a second fastening means. The loop 36 is formed by folding strap 26 back upon its self and securing end 40 by conventional means such as stitching. Lower end 42 of the strap 26 terminates at location 32 where the lower seaward loop 30 is positioned.

Filter cloth 14, at its lower end is folded back and secured to its self forming the toe anchor tube 16. In a preferred form, the lower possibly exposed apron surface area 43 of filter cloth 14 is covered with a protective shield layer 44. The shield layer 44 comprises a sheet of relatively heavy gauge geotextile material capable of withstanding substantial impact by wave driven debris. The shield layer 44 is attached to the filter cloth 14 at 46 and 48 in a conventional manner forming a space 50 therebetween.

With reference again to FIG. 1, a three course Subsurface Dune Restoration System, for purposes of illustration, is shown installed on an area being protected. Each of the three courses are formed by single sand-filled geotextile containers 54, which extend the full length of the protected area. The system including the containers is designed to include curved end portions 60 and 62 for a purpose to be later described. Obviously the system can include any number of courses, the protection afforded increasing with the number of courses installed.

Referring now to FIG. 2, the sand-filled geotextile containers 54 are somewhat tear-drop in cross-section form and are placed with overlapping portions in a stair-stepped relationship as the courses ascend the prepared sloping surface 12. The containers 54 can be formed of a polyvinyl chloride cloth, a synthetic fabric coated with polyvinyl chloride or other suitable geotextile material having desirable salt water and weather resistant characteristics. The synthetic fabric and the coating, when used, must provide a predetermined permeability for a purpose to be later described. Structurally, a preferred form of container 54 comprises a double layered upper surface wherein an exterior shield layer 64 overlaps an interior layer 66 forming a space 68 therebetween for superior abrasion and puncture resistance characteristics. The shield layer 64 is attached to container layer 66 at seams 63 and 65 in locations where the seams are covered by either the particular container or a container lobe 70 of an adjacent container. The apron space 50 and the container spaces 68 provide significant additional puncture protection for the filter underlayment and the containers as an object will have to penetrate the shield layers 44 and 64 and pass through one of the spaces 50 or 68 prior to engaging the layers 14 or 66. The shield layers are constructed from heavier gauge material than that used to construct filter layer 14 and upper surface 66 of container 54. Obviously the shield layer can be constructed of a large range of thicknesses for providing varying degrees of protection. Spaces 50 and 68 can either be left open or be filled any number of conventional cushioning materials. In preferred form the shield layers 44 and 64 have rough exterior surfaces with spaced holes therethrough or sufficient permeability permitting sea water and sand to fill the spaces 50 and 68 for puncture protection in the absence of use of any cushioning material.

The geotextile containers 54 are formed by securing container protective shield layer 64, upper layer 66, bottom layer 72 and tear-drop shaped end layers 74, one at each container end, together by heat sealed or stitched seams 63 and 65. As previously mentioned the container layers are formed of material having predetermined permeable characteristics for purposes later described. With reference to both FIGS. 2 and 3, container bottom layer 72 tacked together at 76 forming a cylindrical section 78 for receiving fluid transfer tube 34. Layer 72 is tacked together at predetermined spaced points 76 forming the cylindrical section 78 for the length of the container 54 as best shown in FIG. 3. The tacking points 76 in layer 72 also creates a depression 80 that extends the length of the container 54 parallel to cylindrical section 78. Fluid transfer tube 34 contains a plurality of holes 78 which are spaced for positioning between the tack points 76 in container 54.

Figure 4:
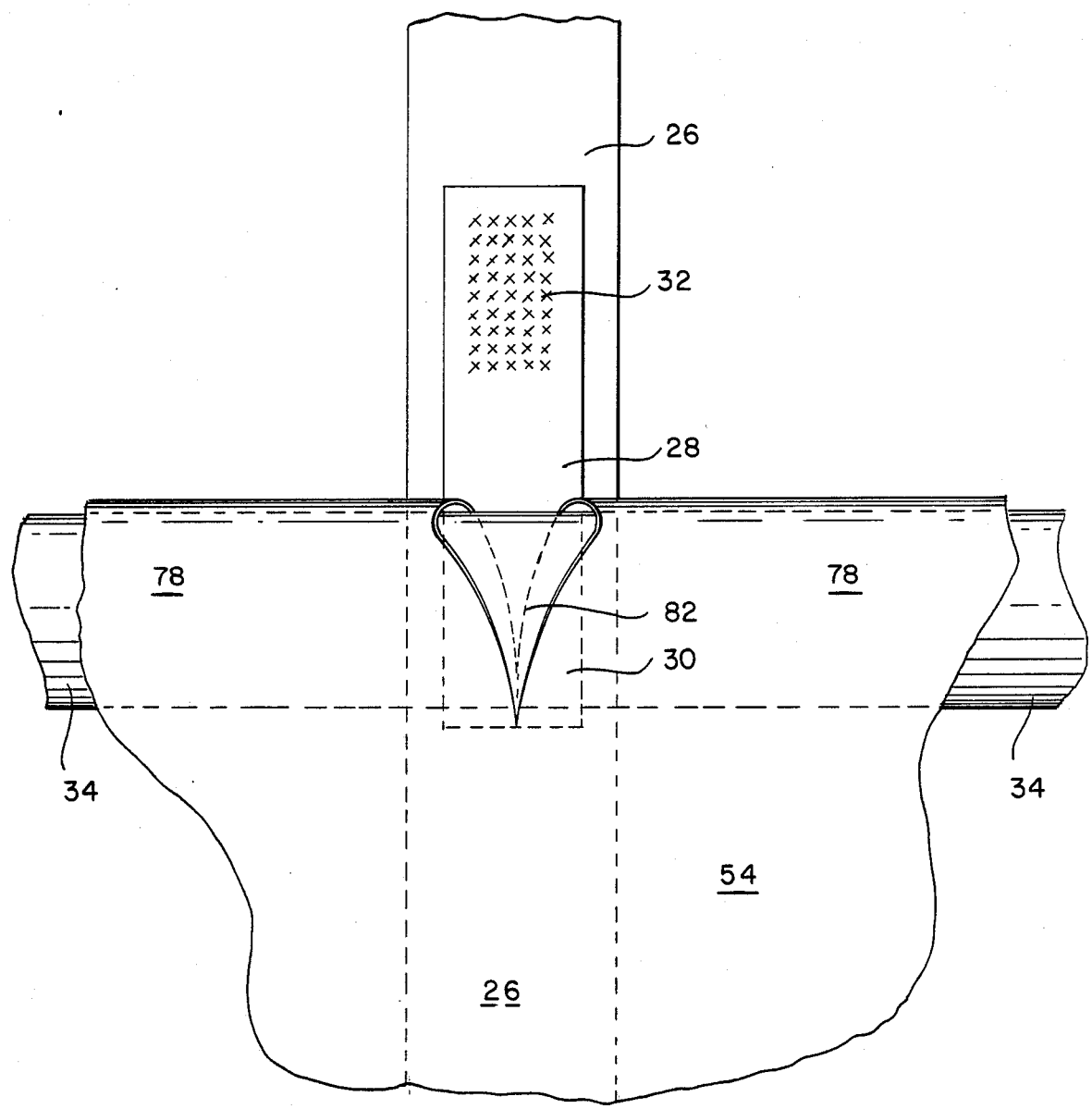
FIG. 4 is a fragmentary plan view illustrating placement of a strap restraint loop within a geotextile protect cell, the loop receiving a fluid transfer tube.

FIGS. 3 and 4 illustrate slits 80 cut into the container cylindrical sections 78 for installation of strap restraint system loops 30 around fluid transfer tube 34. The slits 80 are cut intermediate the tack points 76 along the length of container 54 at predetermined distances sufficient to support the sand-filled container on fluid transfer tube. As best shown in FIG. 4, the slits 80 are spread open for insertion of loops 30 of the straps 28 which are attached to restraining strap 26. A fluid transfer tube 34 is inserted within container cylindrical section 78 and through a series of the spaced strap loops 30 with tube holes 78 positioned intermediate the tack points 76 for supporting and filling the container with sand.

Referring now to FIG. 5, a crest anchor tube system 37 includes a modified restraining strap 26, and a crest anchor tube 38, which may be constructed of polyvinyl chloride or other suitable weather and salt water resistant materials. The crest anchor tube 38 is installed in trench 22 on top of portions 84 of each of a plurality of adjustable straps 90 connecting with straps 26, that are placed at spaced intervals upon the filter cloth 14 in a shore parallel direction along the length of the project. The spaced intervals can, for example, be five feet in length, the critical consideration being the distance is such to provide adequate support for the fluid transfer tubes while they support their respective geotextile containers. The straps 26, each include a loop 86 at their upper free ends that can be formed by folding the end back upon the strap 26, and securing it at area 88. Adjustable straps 90 include a loop 92 formed by securing a first end back upon the strap at 94. A second strap end 96 is used to adjustably secure the strap 26, and fluid transfer tube supporting loops 30 in aligned positions across the length of the geotextile containers. Strap end 96 is passed through loop 86 on strap 26, and through loop 9 and the strap 90 is then adjusted positioning fluid transfer loops 30 on the filter cloth for alignment with cooperating loops 28 in a shore parallel direction. After the adjustment is made, strap end 96 can be tied or otherwise secured in a conventional manner. For example, stainless steel rivets can be used to secure end 96.

Figure 6:
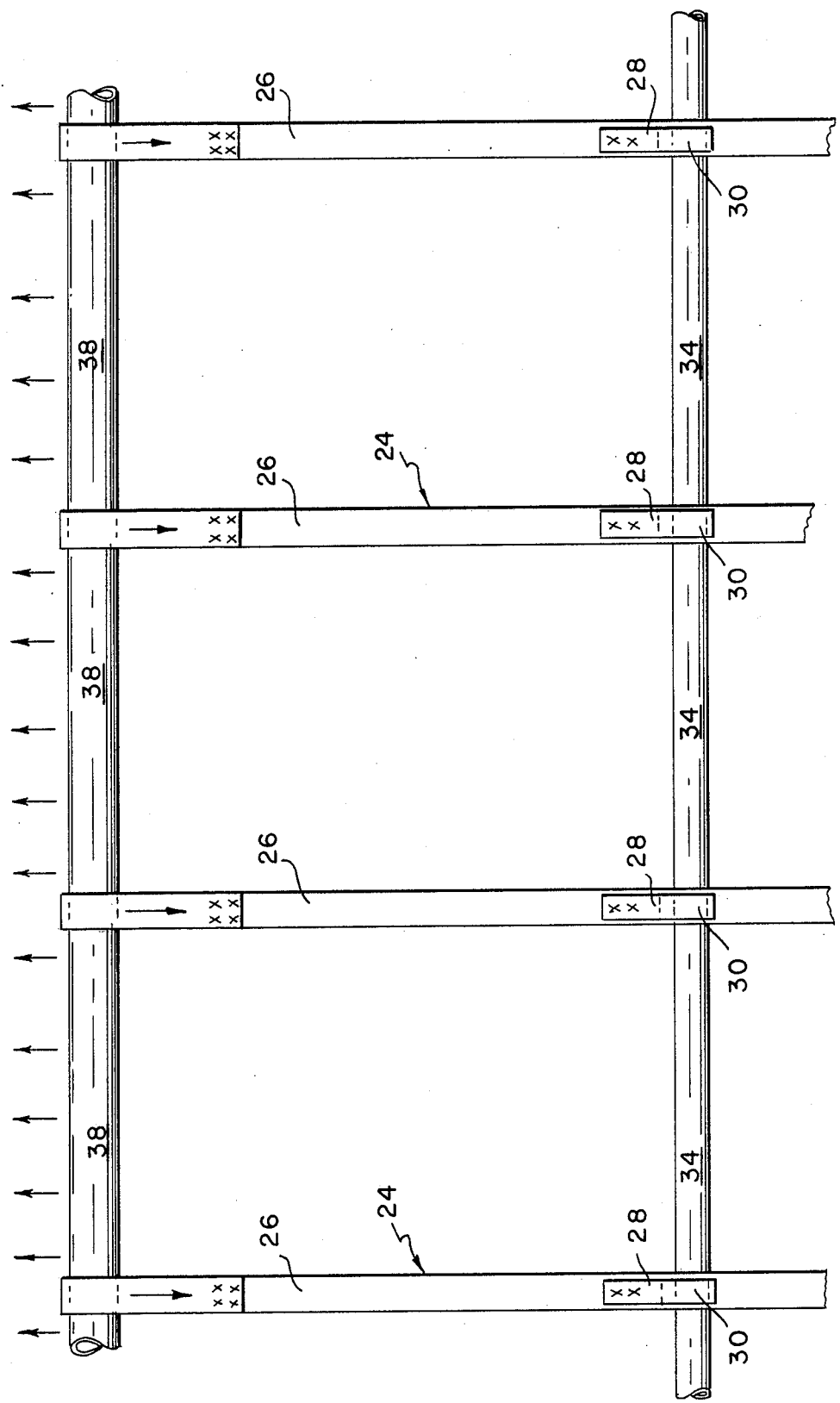
FIG. 6 is a fragmentary end view of an installed strap restraint system illustrating an adjustable feature of the invention.

With reference now to FIG. 6, a crest anchor tube 38, restraining straps 26, fluid transfer tube supporting straps 28 and loops 30, and a fluid transfer tube are shown assembled without presence of a geotextile container for purposes of illustration. Placement of strap assemblies 24 at predetermined distances along the crest anchor tube 38 tends to evenly distribute load forces along the length of the tube. Also positioning of the crest anchor tube within excavated trench 22 tends to reduce the actual force load upon the tube as the straps bear against the dune contour. The strap restraint system 24, including straps 26 function to align loops 30 for receipt of fluid transfer tubes 34 and distribute loading forces of the containers 54 substantially even across the crest anchor tube 38 retaining them in an installed dune erosion prevention position.

During installation, the sloped beach and dune surface 12 is formed by grading and shaping of suitable off-site sand fill as required, as shown in FIG. 2. The off-site sand-fill can be transported to the project site and placed upon the eroded beach and dune areas by any suitable means. A crest anchor trench 22 is then excavated along the upper landward edge of the intended location of the Subsurface Dune Restoration System. A parallel trench 21 is also excavated at the lowest seaward edge of the project for receiving the toe scour protection device 16 and the filter cloth apron 15.

A geotextile filter cloth foundation or underlay 14 is formed by securing numerous swaths of the filter cloth together so that it covers the entire length, width, and breadth of the project surface 12. The filter cloth 14 is spread to extend upward into the crest anchor trench 22. A plurality of adjustable strap assemblies 37 ar placed perpendicular to the shoreline within the trench 22 at predetermined spaced intervals and the crest anchor tube 38 is then installed within the trench. The crest anchor tube 38 is filled with sand to serve as an anchoring device.

Multiple strap restraint systems 24 are positioned perpendicular to the shore line at spaced centers over the project length, with the respective crest loops 86 of the adjustable modification shown in FIG. 5 placed near the trench 22 and the multiple laterally aligned loops 30 running shore perpendicular down the slope 12 upon the filter cloth foundation 14. The number of loops 30 secured to the straps 26 in each strap restraint system 24 will equal the number of courses of containers 54 being used. It is significant that a single container 54 extends the full length of the course adjustable strap system 27 is aligned which each strap restraint. More specifically, the containers are designed to constitute a single course in a particular installation. Adjustable straps 90, shown in FIG. 5, are drawn up tight and their free ends 92 are secured positioning strap loops 30 for receipt of fluid transfer tubes.

An empty geotextile container 54, having a designed length equal to the sloped area 12, is spread out across the full length thereof. It the preferred arrangement, container 54 contains slits 82 at five foot intervals along its upper edge in cylindrical section 78 for receipt of strap loops 30. The strap loops 30 are inserted within the slits 82 while straps 26 extend beneath the container 54. Fluid transfer tubes 34 ar then threaded through cylindrical sections 78 and through the loops 30 at the slits 82 until the tube extends completely through the container and consequently entirely across the prepared sloped area being protected. Holes 78 in the fluid transfer tube 34 are positioned between the container tack points 76 for discharge of a sand slurry into the container. A pumping system, not shown, is connected to one end of the fluid transfer tube and a sand slurry is pumped at a volume and pressure sufficient to fill container 54 with sand. A major portion of the water in the slurry is discharged through the permeable material forming the geotextile container. The sand deposits out as the velocity of the slurry decreases.

As can be seen in FIG. 2, the first container 54, comprising the first course, lies relatively flat upon the filter cloth 14 and sloped surface 12. The second course container 54, however, after filling, is located with lobe 70 overlapping depression area 80 in the first course container 54. Since this overlap extends the entire length of the containers, the slits 82, tack points 76, and container seam 65 are covered by the lobe 70. Each container is formed with seam 63 underneath.

Further to the filling process, the containers can be filled from either end of the fluid transfer tube. The filling process will be influenced by transfer tube size, pump discharge characteristics, hole size in the transfer tube, and length of the project. The aforementioned permeability of the material forming the geotextile containers permits a relatively rapid filling rate as water is discharged through the porus fabric. The degree of permeability is, of course, limited to the extent the geotextile material must be sufficiently closed to retain sand within the formed containers 54.

After the subsurface dune restoration system is installed according to the previous description, a predetermined quantity of compatible sand fill is distributed over the entire system. The sand fill is contoured into a gently sloping beach and dune surface which may be planted with appropriate vegetation to assist in the stabilization of the fill material. The finished dune restoration and revegetation project atop the previously emplaced erosion control system allows for the full recreational use of the naturally appearing beach and dune areas, while providing substantial levels of storm protection hidden below.

As can be readily seen and appreciated from the above description, the Subsurface Dune Restoration System presents a uniquely soft, permeable, stepped, wave absorptive surface, which is designed to gradually dissipate the force of waves impacting the beach and dune areas along the shorelines.

More specifically, the sand-filled geotextile containers 54 are retained in a manner allowing a slight degree of flexibility while still restrained on the fluid transfer tubes 34 within the loops 30 of the strap restraint system 2 when subjected to the severe impacting of rough water and, or, storm wave forces.

It is significant that a wave will first contact the seaward leading edge of lobes 70 of each course of the Subsurface Dune Restoration System as illustrated in FIG. 1. As the wave impacts the lobe 70 of the initially encountered course of a sand-filled geotextile container and continues upwardly against gravity, across the subsequent courses, the wave force and velocity is gradually dissipated b impacting against each of the successive lobes 70. Each successive lobe 70 functions as a flexible wave tripping device producing water particle rotation and tumbling, thereby dissipating wave uprush in a manner similar to the phenomena of near shore waves cresting and breaking over natural reef structures.

It is known that wave action is an orbital rolling action as it impinges against a beach or dune surface and by interfering with this orbital rolling action in a series of stages or steps, the wave's force and velocity is gradually decreased, thus minimizing erosion.

Further, eventually the wave's velocity will be decreased to the extent that some portion of the water will percolate downward through the porus sand-filled geotextile containers 54 and the underlying filter cloth foundation 14 comprising the Subsurface Dune Restoration System.

As percolation occurs over the permeable surface of the exposed Subsurface Dune Restoration System structure, waveborne sand particles carried in suspension by the water velocity begin to settle out of suspension onto the upper surface of the Subsurface Dune Restoration System structure and produce a natural accretion process. Consequently, this invention is extremely significant in that it takes advantage of the natural phenomena of potentially millions of cubic yards of waveborne sand particles in suspension within the littoral system and near shore wave action normally impacting upon a beach and dune surface, and does so through the utilization of a relatively simple system working in harmony with nature.

Additionally, during severe and prolonged storm wave attack upon the exposed portion of the Subsurface Dune Restoration System structure, the contents of the sand-filled geotextile containers return to a semi-liquid state due to the massive quantities of water percolating through the porus containers. Each of the sand-filled geotextile containers thus becomes more flexible and eventually achieves a resiliency which contributes substantially to the innate ability of the Subsurface Dune Restoration System erosion control structure to act as a shock absorber in a manner similar to a natural, porous beach and dune surface, but without the potentially catastrophic uncontrolled movement or loss of the beach and dune materials underlying the Subsurface Dune Restoration System. Movement of the containers is greatly inhibited by their size, for example, a 300 foot unit will weigh approximately 800 tons.

Further, the build-up of hydrostatic water pressure due to storm water run-off from the uplands, landward of the Subsurface Dune Restoration System is prevented by virtue of the permeable nature of the entire erosion control structure.

Upon reaching the extremities of the project area in a shore parallel direction, the Subsurface Dune Restoration System must preferably be swept gradually landward over a graceful curve or arc (such as 60 and 62 in FIG. 1) in order to further minimize the effects of the structure's existence on adjacent coastal properties. Right angles, such as vertical return walls on conventional hard erosion control structures are infamous for creating accelerated erosion on neighboring waterfront properties and are to be avoided. The graceful, wide, curving returns indigenous to the gently sloping Subsurface Dune Restoration System design eliminates the turbulent rotor currents normally associated with abrupt right angle vertical return structures. Gentle, flowing curves assure the greatest possibility of maintaining a more linear hydrodynamic flow of shore parallel current during severe storm surge conditions.

From the above description, it is apparent that this invention provides a Subsurface Dune Restoration System employing soft, permeable, and force absorbing structural surfaces, cooperating with the natural phenomena of wave impact in order to provide an effective beach and dune erosion control system. Additionally, it is significant that when installed, the subject Subsurface Dune Restoration System is not normally visible to users of the beach and, consequentially, does not generally interfere with beach recreational activities in the project area.

It will be apparent to those skilled in the art that various modifications and variations can be made in the Subsurface Dune Restoration System of the present invention without departing from the scope or spirit of the invention. Thus, it is intended that the present invention cover the modifications and variations of this invention provided they come within the scope of the appended claims and their equivalents.

What is claimed is:

1. A subsurface dune restoration system comprising an underlay of filter cloth positioned upon a prepared dune surface having a predetermined slope, a least one sand-filled geotextile container arranged in a row forming a course along the dune generally parallel to the shoreline, a plurality of courses of said sand-filled containers placed upon the dune surface, each of said courses being elevated a predetermined distance relative to an adjacent seaward course as they progress landward up said sloped dune surface forming a soft revetment presenting a specific wave impact surface, said containers being formed of a material having specific flexibility and permeability characteristics, and filling means extending the length of each container, said filling means operable from either end of said container facilitating filling of the containers in their assembled position, wherein said courses terminate in gentle relatively wide sweeping curves preventing turbulent rotor currents and consequent aggravated erosion at the ends of said dune restoration system, said containers normally being covered with a layer of sand whereby a relatively soft subsurface dune restoration system effective to deplete wave energy is formed.

2. A subsurface dune restoration system as described in claim 1 wherein the lower end of said filter cloth underlay is connected to a first fastening means holding the cloth in place upon the beach.

3. A subsurface dune restoration system as described in claim 2 where said first fastening means includes a tube formed by folding said filter cloth back upon itself and filling the tube with sand.

4. A subsurface dune restoration system as described in claim 1 wherein a second fastening means retains the upper end of said filter cloth underlay in place.

5. A subsurface dune restoration system as described in claim 4 wherein said second fastening means comprises a polyvinyl tube filled with sand.

6. A subsurface dune restoration system as described in claim 2 further comprising a strap restraint system retaining said containers in place.

7. A subsurface dune restoration system as described in claim 6 wherein said strap restraint system comprises a plurality of fixed loops, each receiving and retaining a fluid transfer tube positioned within a sand-filled container.

8. A subsurface dune restoration system as described in claim 6 comprising an adjustable strap assembly connected between said second fastening means and said strap restraint system for adjustably securing said restraint system to said second fastening means while also aligning said restraint system to receive a fluid transfer tube.

9. A subsurface dune restoration system as described in claim 6 wherein said strap restraint system includes loop at the uppermost installed end receiving one end of said adjustable strap assembly.

10. A subsurface dune restoration system as described in claim 1 wherein said sand-filled geotextile containers are formed with a cylindrical section having a plurality of spaced slits each receiving a restraining strap loop through which a fluid transfer tube is inserted when placed within said cylindrical section.

11. A subsurface dune restoration system as described in claim 1 wherein said sand-filled geotextile containers present a curved lobe wave impact surface when installed in a stair-stepped landward ascending disposition.

12. A subsurface dune restoration system as described in claim 1 wherein said geotextile containers because of the designed permeability become more pliable and soft as the contained sand becomes more fluid providing a soft flexible revetment when exposed to waves washing up the beach.

13. A subsurface dune restoration system as described in claim 1 wherein said wide sweeping course curves geometrically define obtuse angles.

14. A subsurface beach and dune restoration system comprising an underlay of filter cloth placed upon a prepared beach and dune surface having a predetermined slope rising as it extends landward, an apron surface of filter cloth having a slope different from said underlay slope, a toe scour protection tube formed in the seaward edge of said apron surface providing a first means securing said restoration system, said protection tube being filled with sand, a plurality of strap restraint systems placed at spaced intervals across said underlay and extending seaward to landward, each of said strap restraint systems including a plurality of loops extending serially upward as the restraint system progresses up the sloped beach and dune surface, each of said loops being in lateral alignment with adjacent strap restraint system loops forming shoreline parallel rows of loops across said filter cloth underlay, a fastening crest loop secured to upper end of each strap restraint system, an upper edge of said filter cloth underlay being placed within a trench extending shoreline parallel along said prepared beach and dune surface, an adjustable strap assembly positioned adjacent the upward end of each strap restraint system, said adjustable straps each having two free ends and being placed in the trench upon said underlay of filter cloth, a crest anchor tube placed upon said underlay and upon each of said adjustable strap assemblies within the trench and extending the length thereof, said crest anchor tube filled with sand, a first free end of each of said adjustable strap assemblies having loop secured thereon, a second free end being passed through respective fastening crest loops of said strap restraint systems and through said first end loop, said second end then being sufficiently tensioned to restrain said strap restraint systems and secured in place, and a geotextile container extending across the area being protected, a cylindrical section formed in said container with slits therein at spaced intervals, a strap restraint loop placed within each of said slits, spaced tacked areas in said container forming a depression there across adjacent said cylindrical section, and a fluid transfer tube inserted through said container cylindrical section and through each of said strap restraint loops within said slits, said fluid transfer tube containing holes at predetermined locations for filling said container with sand, said container being substantially tear-drop in form and having an area of depression thereacross adjacent said cylindrical section, said container tear drop form including a lobe end portion, said lobe portion of an upper adjacent container fitting into the depression area of a lower container covering said slits and seams in the geotextile material forming said container, said fitting of said lobe portion within said depression area being effective to aid retaining said container in place, said container being formed of a geotextile material having a predetermined permeability, weather and water resistant characteristics, the predetermined permeability facilitating hydraulic filling of the container as water seeps therethrough while retaining sand therein, the permeability also being effective permitting water washed upon the protective surface to enter the containers and create a semi-fluid condition therein providing a soft revetment operative to dissipate impacting wave action.

* * * * *